United States Patent [19]

Nakahashi et al.

[11] Patent Number: 5,543,452
[45] Date of Patent: Aug. 6, 1996

[54] FLAME-RESISTANT POLYAMIDE RESIN COMPOSITIONS AND FLAME RETARDANTS THEREFOR

[75] Inventors: Junichi Nakahashi; Itaru Natori, both of Nobeoka, Japan

[73] Assignee: Asahi Kasei Kogyo Kabushiki Kaisha, Osaka, Japan

[21] Appl. No.: 425,451

[22] Filed: Apr. 20, 1995

Related U.S. Application Data

[63] Continuation of Ser. No. 139,103, Oct. 21, 1993, abandoned, which is a continuation-in-part of Ser. No. 854,780, Mar. 23, 1992, abandoned, which is a continuation of Ser. No. 323,797, Mar. 15, 1989, abandoned.

[30] Foreign Application Priority Data

Mar. 15, 1988 [JP] Japan ..................................... 63-59270
Jul. 27, 1988 [JP] Japan ................................... 63-187825
Jul. 27, 1988 [JP] Japan ................................... 63-187826

[51] Int. Cl.$^6$ ..................................................... C08L 77/00
[52] U.S. Cl. ........................... 524/430; 524/410; 525/66; 525/133; 525/166; 525/179
[58] Field of Search ............................. 525/66, 183, 179, 525/133, 166; 524/538, 430, 410

[56] References Cited

U.S. PATENT DOCUMENTS

| | | | |
|---|---|---|---|
| 4,137,212 | 1/1979 | Theysohn et al. | 524/412 |
| 4,373,049 | 2/1983 | Richardson | 524/375 |
| 4,528,326 | 7/1985 | Dean | 525/66 |
| 4,728,463 | 3/1988 | Sutker et al. | 252/609 |

FOREIGN PATENT DOCUMENTS

| | | |
|---|---|---|
| 0047549 | 8/1983 | European Pat. Off. . |
| 0276988 | 3/1988 | European Pat. Off. . |
| 0270151 | 8/1988 | European Pat. Off. . |
| 51-47044 | 4/1976 | Japan . |
| 51-47034 | 4/1976 | Japan . |
| 56-50931 | 5/1981 | Japan . |
| 57-53505 | 3/1982 | Japan . |
| 60-19517 | 1/1985 | Japan . |
| 61-34058 | 2/1986 | Japan . |

OTHER PUBLICATIONS

Chemical Abstracts (1986) vol. 105, No. 6.
English language abridgement of JP-A-51-47044.
English language abridgement of JP-A-51-47034.
English language abstract of JP-A-57-53505.
English language abstract of JP-A-60-19517.
English language abstract of JP-A-61-34058.
English language abstract of JP-A-56-50931.
English language abstract of JP-A-60-86162.

*Primary Examiner*—Ana L. Carrillo
*Attorney, Agent, or Firm*—Birch, Stewart, Kolasch & Birch, LLP

[57] ABSTRACT

A flame-resistant polyamide resin composition comprising components:

(A) a polyamide or a blend of a polyamide with another polymer, (B) a flame retardant comprising a brominated styrene or styrene derivative polymer having acid anhydride groups, and (C) a flame retardant comprising a brominated polystyrene.

13 Claims, 3 Drawing Sheets

FLAME-RESISTANT POLYAMIDE RESIN COMPOSITIONS AND FLAME RETARDANTS THEREFOR

This application is a continuation, of application Ser. No. 08/139,103 filed on Oct. 21, 1993, now abandoned, which is a continuation-in-part of application Ser. No. 07/854,780 filed on Mar. 23, 1992, now abandoned, which is a continuation of application Ser. No. 07/323,797, filed on Mar. 15, 1989, now abandoned.

BACKGROUND OF THE INVENTION

1. Field of the Invention

The present invention relates to a flame retardant comprising a brominated styrene or styrene derivative polymer having acid anhydride groups. Further, the present invention relates to a flame-resistant polyamide resin composition comprising the flame retardant. Said composition is mainly used in electrical and electronic fields.

2. Discussion of Related Art

Polyamides, because of their high thermal resistance and mechanical characteristics, are successfully used in the electrical and electronic fields. In these fields, a high degree of flame resistance is required for resin materials by the UL Regulation of the United States. To make polyamides flame-resistant, there have been used nitrogen-containing flame retardants (e.g. melamine cyanurate), halogen-containing flame retardants (e.g. octachlorine adduct of cyclopentadiene, brominated polyphenylene ether, brominated polystyrene), etc. Among these, melamine cyanurate is such a poor flame retardant that it is difficult to make glass fiber-containing compositions highly flame-resistant. Among the halogen-containing flame retardants, the former two are inferior in thermal stability to the brominated polystyrene. At the present time, brominated polystyrene is the best known flame retardant for rendering polyamides flame-resistant.

As to brominated polystyrene and flame-resistant compositions comprising polyamides and brominated polystyrene, there are known JP-A-51-47034, JP-A-51-47044, JP-A-57-53505, JP-A-61-34058, and U.S. Pat. Nos. 4,137,212 and 4,373,049.

Also, as examples of compositions which are not flame-resistant, but are superior in mechanical strength, these compositions which comprises a polyamide and a copolymer of styrene or a styrene derivative and an unsaturated carboxylic acid anhydride, are disclosed in JP-A-56-50931, JP-A-60-86162 and JP-A-60-19517.

It was found, however, that the polyamide compositions with brominated polystyrene as a flame retardant have a serious drawback in that thin molded products which are made of these compositions are inferior in strength at the weld portion. A connector, one of the important parts in the electrical and electronic fields, has a hole for pin insertion at the very weld portion. When the weld strength of the material is low, there occurs a problem that cracks are produced when a pin is forced into the hole.

SUMMARY OF THE INVENTION

As a result of an extensive study, the present inventors have solved the foregoing problem by using as a flame retardant a brominated styrene or styrene derivative polymer having from 0.1 to 20 mole % of acid anhydride groups, in which the bromine content is from to 80 wt. %.

More particularly, the present invention relates to a flame-resistant polyamide resin composition comprising components:

(A) a polyamide or a blend of a polyamide with another polymer, (B) a flame retardant comprising a brominated styrene or styrene derivative polymer having from 0.1 to 20 mole % of acid anhydride groups, in which the bromine content is from 50 to 80 wt. %, and (C) a flame retardant comprising a brominated polystyrene, in which the bromine content is from 50 to 80 wt. %, said composition satisfying the following conditions:

$$a+b+c=100$$

$$0.5 \leq b \leq 35$$

$$0 \leq c \leq 34.5$$

$$5 \leq b+c \leq 35$$

$$0.1 \leq \alpha \leq 20$$

$$14 \leq b \times 0.01x + c \times 0.01y \leq 20$$

wherein a, b and c represent the amounts in wt. % of components (A), (B) and (C), respectively, x and y represent the bromine contents in wt. % of components (B) and (C), respectively, and $\alpha$ represents the total content in mole % of the acid anhydride groups of components (B) and (C). Yet more particularly, the present invention relates to a flame retardant comprising a brominated styrene or styrene derivative polymer having from 0.1 to 20 mole % of acid anhydride groups, in which the bromine content is from 50 to 80 wt. %.

1 Weld portion

2 Sprue

3 Runner

4 Test piece

Figure 2:
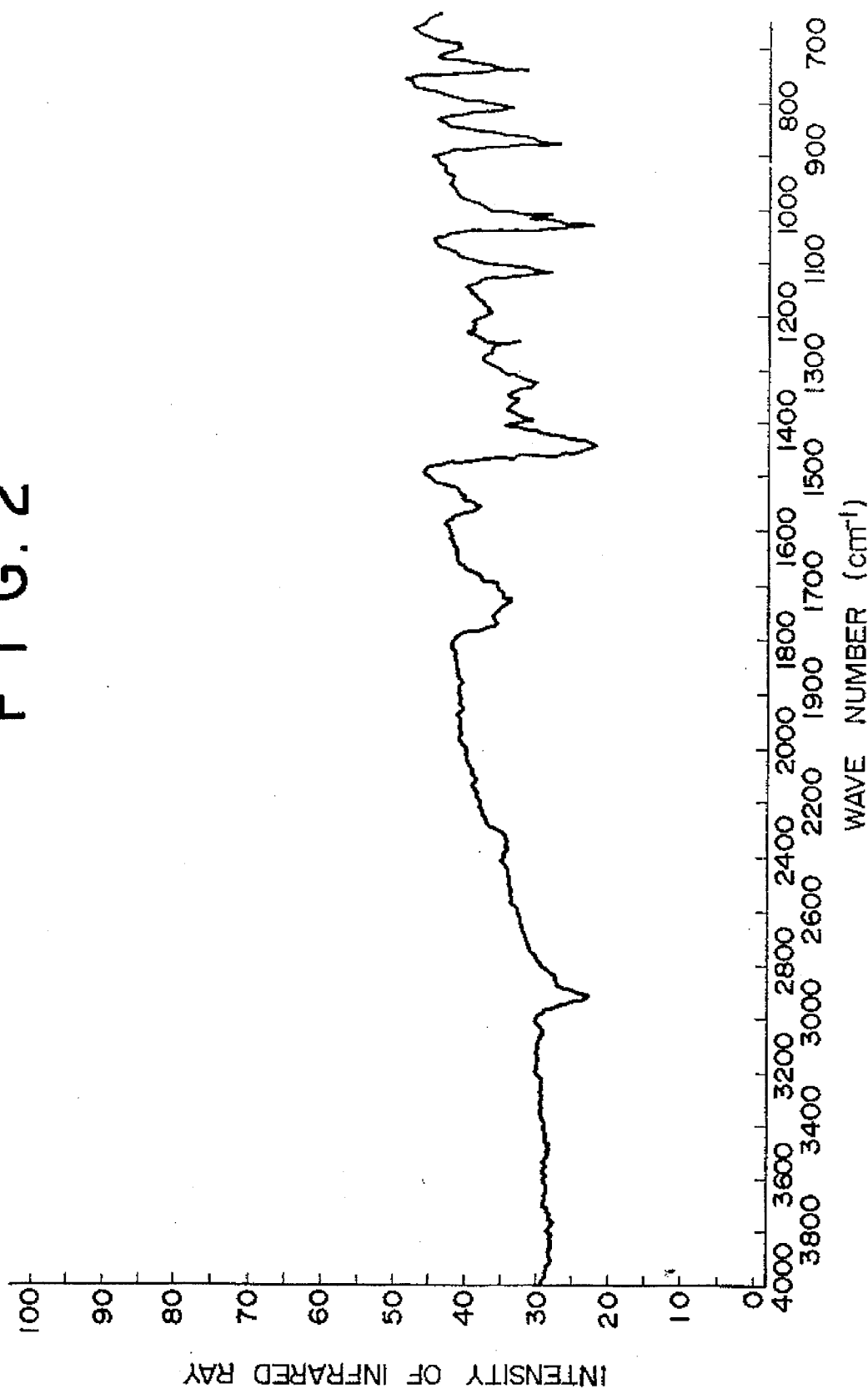

FIG. 2 shows an infrared spectrum of the flame retardant of the present invention obtained in the production examples.

Figure 3:
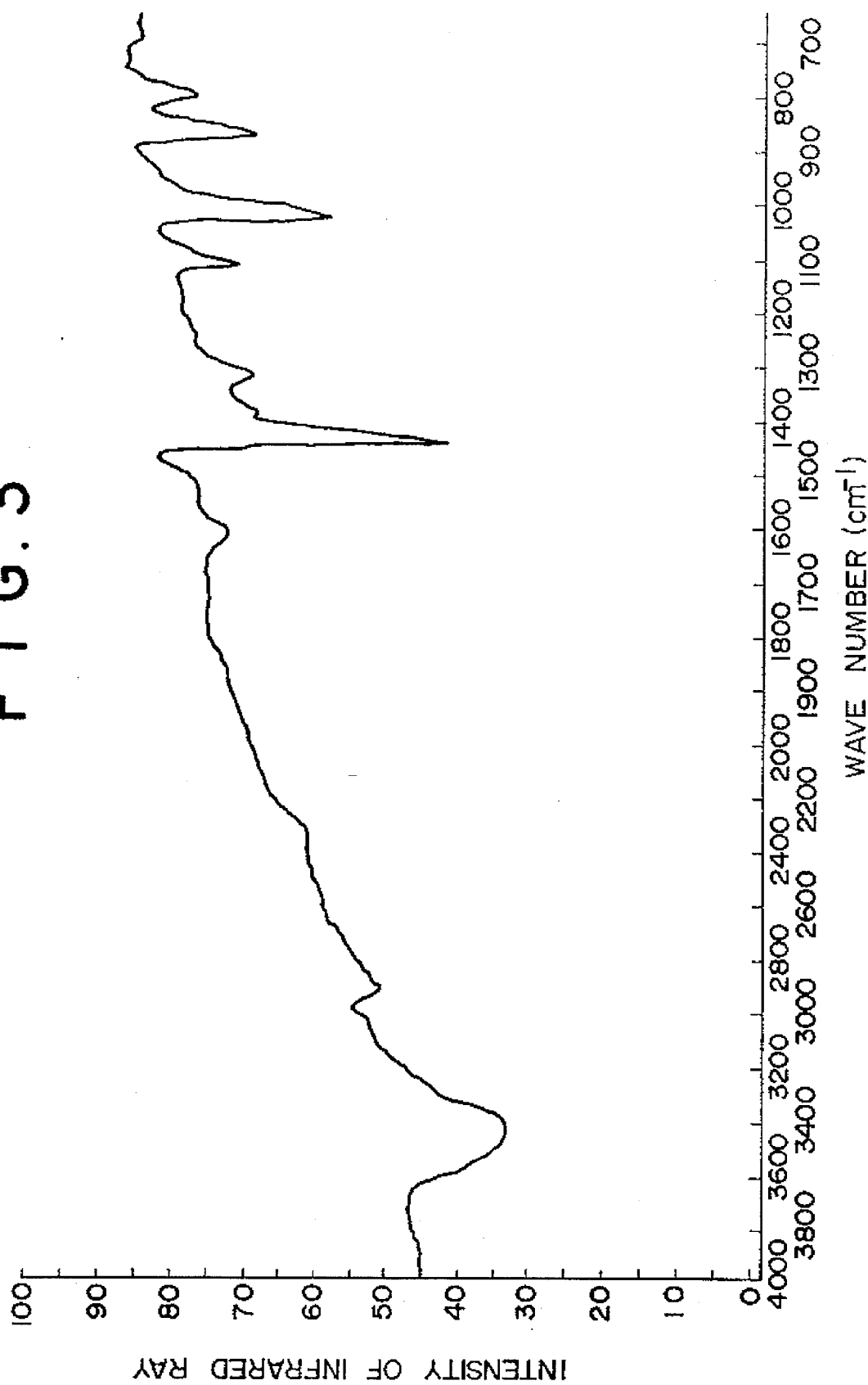

FIG. 3 shows an infrared spectrum of the brominated polystyrene.

DETAILED DESCRIPTION OF THE PREFERRED EMBODIMENTS

The present invention will be illustrated below in detail.

The polyamide, a matrix, of the present invention is a linear polymer having amide bonds, and is obtained by means of three methods: Polycondensation of an organic diamine with an organic dicarboxylic acid, polycondensation of an aminocaproic acid and ring-opening polymerization of a lactam. Examples of the organic diamine include tetramethylenediamine, hexamethylenediamine, m-xylylene-diamine, etc.; examples of the organic dicarboxylic acid include adipic acid, sebatic acid, dodecanedicarboxylic acid, terephthalic acid, isophthalic acid, etc.; examples of the aminocaproic acid include ε-caproic acid and 11-aminoundecanoic acid; and examples of the lactam include ε-caprolactam, ω-laurolactam, etc. The polyamide may be copolymers of these compounds or polymer blend thereof. Among these polyamides, nylon-6,6, polyamides consisting mainly of nylon-6,6 and copolymers of terephthalic acid, adipic acid, hexamethylenediamine and nylon-4,6 are preferred particularly in terms of solder dip resistance and mechanical properties. For example, there may be mentioned copolymers of nylon-6,6 and nylon-6, blends of nylon-6,6 and nylon-6, copolymers of nylon-6T and nylon-6,6 (T means terephthalic acid), terpolymers of nylon-6T, nylon-6,6 and nylon-6,12, etc.

The flame retardant of the present invention, i.e., component (B), a brominated styrene or styrene derivative polymer having from 0.1 to 20 mole % of acid anhydride groups, in which the bromine content is from 50 to 80 wt. %, is obtained by brominating a copolymer of an unsaturated compound, such as styrene, α-methylstyrene, p-methylstyrene, etc., and is represented by formula (1):

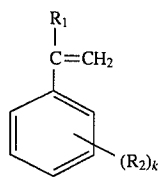

(1)

wherein R1 and R2, which may be the same or different, each represent a hydrogen atom or an alkyl group having from 1 to 3 carbon atoms, and k represents an integer of from 1 to 5, and an unsaturated compound having an acid anhydride group, for example an α,β-unsaturated dicarboxylic acid anhydride (e.g. maleic acid anhydride, citraconic acid anhydride), the content of the acid anhydride groups of said copolymer being limited to a range of from 0.1 to 20 mole %, so that the bromine content will be from 50 to 80 wt. %. The method of copolymerization may be any of the method of random copolymerization, block copolymerization, alternating copolymerization, etc. Alternatively, the brominated polymer of component (B) may be formed by a method in which said unsaturated compound having an acid anhydride group is added to a brominated styrene or styrene derivative polymer.

The introduction of bromine may be carried out by any of the following methods: A previously brominated unsaturated compound represented by formula (1) is used in the polymerization; a compound having no bromine represented by formula (1) is polymerized and brominated, after which an unsaturated compound having an acid anhydride group is added to and reacted with the resulting brominated polymer; an unsaturated compound having no bromine represented by formula (1) is copolymerized with an unsaturated compound having an acid anhydride group, after which the resulting copolymer is brominated; and the compound represented by formula 1 is firstly polymerized, then the unsaturated compound having an acid anhydride group reacts with the thus polymerized compound, and thereafter the resulting product is brominated.

The molecular weight of the brominated polymer of component (B) may be from several thousand to several hundred thousand. A molecular weight which is too low is not preferred in terms of thermal resistance, and a molecular weight which is too high is also not preferred because this would result in the melt viscosity becoming too high. The bromine content is preferably from 50 to 80 wt. %. When the bromine content is too low, it could be necessary to add a large amount of this polymer to the polyamide in order for a high degree of flame resistance to be obtained, which would result in the deterioration of the mechanical properties. A bromine content which is too high would make the thermal resistance unstable.

The amount of acid anhydride groups contained in the brominated polymer of component (B) are preferably from 0.1 to 20 mole %. When the amount is too small, the compatibility of the polymer with the polyamide is not present, and as a result, the weld strength is occasionally not sufficiently improved and the flame resistance is not sufficiently developed. A content of acid anhydride groups which is too high would cause decomposition of the polyamide on being mixed therewith.

The mole % referred to herein, which is a unit of the amount of the acid anhydride group, is expressed in terms of the monomer content of the styrene or styrene derivative polymer. For example, in the case of a copolymer of styrene and maleic acid anhydride, the mole % is a value obtained by dividing the number of moles of maleic acid anhydride by the total number of moles of styrene or styrene derivative and maleic acid anhydride and multiplying the resulting quotient by 100. In the case of the addition product of a brominated polystyrene with maleic acid anhydride, the mole % is a value obtained by dividing the number of moles of maleic acid anhydride by the total number of moles of styrene and maleic acid anhydride and multiplying the resulting quotient by 100.

As a method by which the acid anhydride groups are incorporated into the brominated polymer of component (B), the method which comprises adding the groups to a brominated polystyrene is more preferable than a method which comprises incorporating the groups into the polymer chain. When employing the former method, the product obtained, when used in a flame-resistant polyamide resin composition, characterizes the composition with good thermal stability, and the elongation of the weld portion of the molded products which are made of the composition is large.

One example of a method for producing the brominated polymer of component (B) of the addition product-will be illustrated below using maleic acid anhydride as an example of the compound which provides the acid anhydride group.

A method is preferred in which brominated polystyrene is reacted with maleic acid anhydride in an aromatic organic solvent using benzoyl peroxide in an amount of from 0.01 to 0.5 mole based on 1 mole of the monomer unit in the brominated polystyrene.

The brominated polystyrene, is a known compound, and may be produced by any of the conventionally known methods. For example, JP-A-57-5305 discloses a method for brominating polystyrene.

What is essential to the aromatic organic solvent is that it is a solvent which is common to the compound of formula (1) and maleic acid anhydride. Particularly, solvents having a relatively high boiling point are preferred, and solvents which are not susceptible to the chain transfer reaction are more preferable. Specific examples of such solvents include aromatic halogen compounds and their derivatives. Particularly, o-dichlorobenzene is preferably used.

The amount of benzoyl peroxide used in this reaction is in the range of from 0.01 to 0.5 mole, preferably from 0.05 to 0.4 mole based on 1 mole of the monomer unit in the brominated polystyrene. When the amount is little, a sufficient amount of the maleic acid anhydride group cannot be introduced. When the amount is extremely large, undesirable phenomena such as decomposition, foaming and coloration of the brominated polystyrene would result.

Also, peroxides which are more stable than benzoyl peroxide, for example dicumyl peroxide, di-tert-butyl peroxide, 1,1-bis(tert-butylperoxy)-3,3,5-trimethylcyclohexane, 2,5-dimethyl-di(tert-butylperoxy)hexane, etc., may be used. However, since introduction of maleic acid anhydride into brominated polystyrene is more difficult than its introduction into styrene, when the introduction of a sufficient amount of maleic acid anhydride is desired, the addition of an extremely large amount of the peroxide becomes necessary. Industrially, this is very disadvantageous.

In the present invention, the reaction temperature is from 0° to 300° C., preferably from 60° to 150° C. When this reaction temperature is raised to an excess, foaming and decomposition would occur and desirable results would not be obtained. Whereas when the reaction temperature is lowered to an excess, the reaction will not proceed sufficiently and the desired object cannot be attained. Generally, the reaction time is from 5 minutes to 20 hours, preferably from about 1 to about 9 hours. The pressure is not particularly limited, but it is generally convenient to carry out the reaction under normal pressure.

The brominated polystyrene of component (C), in which the bromine content is from 50 to 80 wt. %, is used in the composition of the present invention and is a polymer of styrene, α-methylstyrene, p-methylstyrene or the like, containing from 50 to 80 wt. % of bromine. When the bromine content is low, the flame-resistant efficiency per amount of the brominated polymer of component (C) added decreases, so that it is necessary to increase the added amount, which leads to reduction in the mechanical properties. When the bromine content is too high, the polymer becomes thermally unstable.

The amounts of components (A), (B) and (C) of the present invention, are weight percentages a, b and c, respectively, and are expressed by the following equations:

$$a+b+c=100$$

$$0.5 \leq b \leq 35$$

$$0 \leq c \leq 34.5$$

$$5 \leq b+c \leq 35$$

$$0.1 \leq \alpha \leq 20$$

$$14 \leq b \times 0.01x + c \times 0.01y \leq 20$$

wherein x and y represent the bromine contents in wt. % of components (B) and (C), respectively, and α represents the total content in mole % of the acid anhydride groups of components (B) and (C).

When (B) and (C) are used together and b is less than 0.5, sufficient affinity to the polyamide is not obtained, and when (B) is used alone, the flame resistance is poor. A preferred b is 5 or more. To increase b to larger than 35 is not only impractical because the flame resistance has already reached a sufficiently high level in the range specified above, but would also lead to a reduction in the mechanical properties of the polyamide.

Although the amount of component (C), c, is less than 34.5 wt. %, it may be 0 wt. % in some cases. When c exceeds 34.5, the mechanical properties and weld strength become poor. A preferred c is 30 or less.

The sum of b and c being 5 or more is needed. When said sum is less than 5, the flame resistance is poor. Also, the sum is preferably not larger than 35, because the flame resistance would have already reached a sufficiently high level before the sum has reached 35, so that a further increase in the sum is not economical and impractical. Further, when the sum is more than 35, the mechanical properties and weld strength lowered.

The value of α is not less than 0.1 and not more than 20. This value determines the compatibility of polyamide with the flame retardant components (B) and (C). The weld strength is determined by the amount of the flame retardants present in the polyamide resin composition and compatibility of these flame retardants with the polyamide. As the amount, (b+c), decreases, the weld strength increases. If the compatibility of the polyamide with the flame retardants (B and C) is high, the weld strength also increases. The compatibility of the polyamide with the flame retardants improves as the value of a increases. When α is less than 0.1, the compatibility is poor and the weld strength weakens. When α is so large as to exceed 20, occasionally the acid groups will cause the polyamide to decompose, thus resulting in problems such as a reduction in the extrusion processability and mechanical properties, color change, etc. Accordingly, the value of a is not to exceed 20. A preferred α is 10 or less. The increasing value of b/c becomes favorable to the weld strength, and b/c is preferably not less than 0.5.

The value of α affects both the strength and elongation of the weld portion, and the elongation increases as α increases. The elongation of the weld portion, as in the case of strength thereof, is a very important physical property in preventing the connector from cracking when a pin is forced into the connector. This is because, when the elongation is low, the connector cracks by a slight spread at the weld portion when a pin is forced into the connector. If the elongation of the weld portion is 5% or more, the results obtained are good. The elongation of the weld portion is preferably 8% or more, and more preferably 10% or more. The value of α is preferably 1.5 or more, and more preferably 2.2 or more.

Further, the value of an equation, $b \times 0.01x + c \times 0.01y$, which expresses the bromine content based on the polymer components is not less than 14 and not more than 20. When the value is less than 14, the flame resistance is poor. When it is not less than 14 and not more than 20, the flame resistance is good, and a value of more than 20, lowers the mechanical properties and weld strength.

The compositions of the present invention may contain a metal oxide as an auxiliary flame retardant. Such retardants include antimony trioxide, antimony pentoxide, sodium antimonate, zinc oxide, iron oxide, tin oxide, calcium oxide, copper oxide, titanium oxide, aluminum oxide, etc. Zinc borate is also known as an effective auxiliary flame retardant. Among these, antimony trioxide is the most effective auxiliary flame retardant. The amount of these retardants blended is from 0 to 15 parts by weight, preferably 5 parts by weight or less based on 100 parts by weight of the total amount of components (A), (B) and (C).

Particularly, in order to obtain a high degree of flame resistance, for example, enough to pass the V-0 Standards of the UL Regulations in the United States at a thickness of 0.8 mm, 1 part by weight of the auxiliary flame retardant is usually necessary. On the other hand, however, these auxiliary flame retardants lower the strength of the weld portion and tensile strength to the same degree as or more severely than brominated polystyrene. Consequently, the amount of the auxiliary flame retardants should be confined to a necessary minimum.

The brominated polystyrene containing the acid anhydride groups of the present invention, when added to polyamides, provides a higher flame resistance than the common brominated polystyrene. Accordingly, the amount of antimony trioxide, an auxiliary flame retardant, can be decreased.

The compositions of the present invention may also contain glass fibers, metallic fibers, inorganic fibers, organic fibers, inorganic fillers, etc. As described above, parts in electrical and electronic fields show an increasingly strong tendency to become light, thin, short and small, so that parts which have been reinforced with glass fibers are popularly used. The amount of these fibers and fillers blended is from 5 to 100 parts by weight based on 100 parts by weight of the total amount of components (A), (B) and (C) and, if necessary, the auxiliary flame retardant.

The compositions of the present invention, may also contain the known additives for polyamides or styrene or styrene derivative resins. As examples of these additives, there are mentioned thermal stabilizers such as copper compounds, alkali metal halides, hindered phenol compounds, hindered amine compounds, etc.; lubricants or mold release agents such as metal stearates, metal montanates, ethylene bis-stearylamide, methylene bis-stearylamide, montanic acid esters, polyethylene glycol, mineral oils, etc.; and coloring agents (e.g. dyes, pigments), plasticizers, ultraviolet ray absorbers, antistatic agents, reinforcing agents, etc.

A part of the polyamide may be replaced by other polymers forming a blend of a polyamide and another polymers in order to improve the physical properties such as water absorption, impact resistance, etc. and processability. Such other polymers include for example olefin polymers (e.g. polyethylene, polypropylene, ethylene/propylene copolymers), styrene or styrene derivative polymers (e.g. polystyrene, styrene/butadiene copolymers, hydrogenated styrene/butadiene copolymers), various engineering plastics (e.g. polyphenylene oxide, polycarbonate, polyethylene terephthalate, polyphenylene sulfide), etc. In this case, these polymers are part of component (A).

In producing the compositions of the present invention, it is important to knead the components well. If possible, it is desirable to use a high-performance kneading type twin-screw extruder. Examples of this extruder include ZSK (produced by Wellner Frydiller, Inc.), PCM (produced by Ikegai Iron Works, Ltd.), etc. For feeding glass fibers and inorganic fillers, the side-feed method is preferred. Otherwise, occasionally, the surface treating agents which are used for glass fibers and inorganic fillers react with an $\alpha,\beta$-unsaturated dicarboxylic acid anhydride to produce undesirable results.

The compositions of the present invention have a high degree of flame resistance and provide high strength and elongation of the weld portion, so that they are very useful as a material for parts used in the electronic and electrical fields. Further, the compositions have a good thermal stability, so that productivity at the time of extrusion or molding is high, and further the molded products have a good surface state and no color change.

EXAMPLES

The effect of the present invention will be illustrated more specifically with reference to the following examples.

First, materials, preparation of test pieces and testing methods used in the examples and comparative examples will be shown.

1. Materials (1) Polyamide

Ny 66: Nylon-6,6 [Relative viscosity in sulfuric acid (JIS-K-6810) 2.85]

Ny 6T66: Nylon-6,6/nylon-6T (66/34) copolymer [Relative viscosity in sulfuric acid (JIS-K-6810) 2.45]

(2) Brominated polystyrene

BrPS: Brominated polystyrene having a bromine content of 68 wt. % (Pyrocheck 68PB, produced by Ferro Corp.).

(3) Metal oxide $Sb_2O_3$: Antimony trioxide (PATOX-C, produced by Nippon Seiko K.K.)

(4) Glass fiber

GF: Glass fiber (MA-416, produced by Asahi Fiber Glass Co., Ltd.)

(5) Brominated product of a copolymer of an aromatic vinyl compound with an $\alpha,\beta$-unsaturated dicarboxylic acid anhydride BrSMAC-1: Brominated product of a styrene/maleic acid anhydride (90.5 mole %: 9.5 mole %) copolymer (Dailark 232, produced by Sekisui Plastics Co., Ltd.); bromine content, 65 wt. %.

BrSMAC-2: Brominated product of a styrene/maleic acid anhydride (84.2 mole %: 15.8 mole %) copolymer (Dailark 332, produced by Sekisui Plastics Co., Ltd.); bromine content, 62 wt. %.

(6) Maleic acid anhydride adduct of brominated polystyrene MBrPS: 52.5 Grams of brominated polystyrene (BrPS), 53.9 g of maleic acid anhydride and 15.4 g of 2,5-dimethyl-2,5-di(tert-butylperoxy)hexane (Perhexa 25B, produced by Nippon Oils & Fats Co., Ltd.) were dissolved in 500 ml of o-dichlorobenzene, and reacted at 130° C. for 5 hours under a nitrogen gas stream. After completion of the reaction, the reaction solution was poured into methanol to precipitate a polymer. This polymer was collected by filtration, washed with a large amount of methanol and dried at 65° C. under a nitrogen gas stream to obtain a maleic acid anhydride adduct of brominated polystyrene. The addition rate of maleic acid anhydride was 1.7 mole %.

(7) Styrene/maleic acid anhydride copolymer

SMAC-2: Styrene/maleic acid anhydride (84.2 mole %: 15.8 mole %) copolymer (Dailark 332, produced by Sekisui Plastics Co., Ltd.).

(8) Polystyrene

PS: Polystyrene having a molecular weight of from 160,000 to 180,000 (produced by Wako Junyaku Co., Ltd.).

2. Preparation of test pieces

Required amounts of the materials were blended in a tumbler-type blender and melt-kneaded on an extruder to prepare strands. After cooling with water, the strands were formed into pellets by means of a cutter. The extruder used was PCM 45 (same direction rotation) having screws of 45 mm in diameter produced by Ikegai Iron Works, Ltd. The glass fiber was fed by the side-feed method.

The pellets thus obtained were molded on an injection molding machine (N-70B II, produced by Japan Steel Works, Ltd.) to prepare test pieces.

3. Testing method (1) Thin-plate tensile characteristics of weld portion

Figure 1:
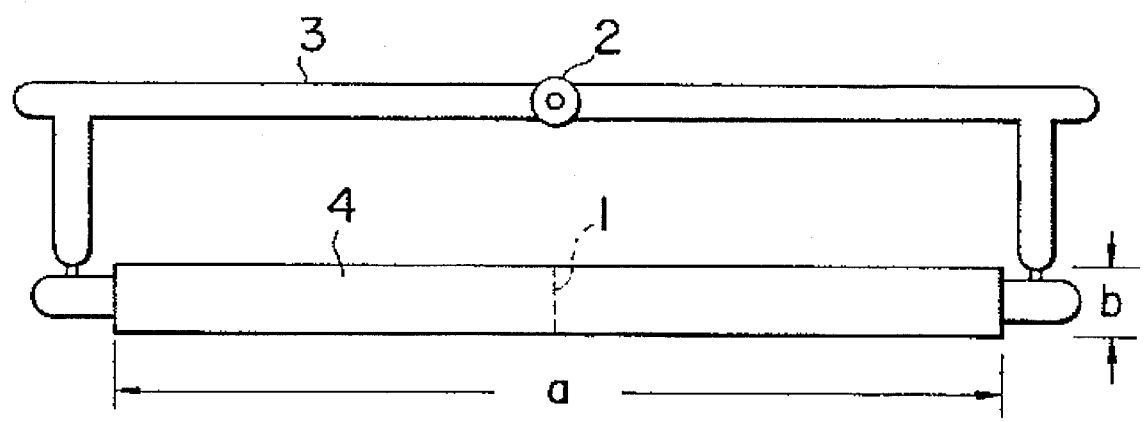
FIG. 1 is a plan view of a mold for preparing test pieces used in the examples of the present invention.

Molded pieces were prepared using a mold, shown in FIG. 1, having a form of 127 mm in length (a in FIG. 1), 12.7 mm in width (b in FIG. 1) and 0.8 mm in thickness which was made so that a molten resin may flow into the mold at the both ends and form a weld portion 1 at the central portion. The molded pieces were tested according to the tensile testing method of ASTM-D-638 to measure the tensile strength and tensile elongation. In FIG. 1, 2 is a sprue, 3 is a runner and 4 is a test piece.

(2) Tensile characteristics of normal portion Tested according to ASTM-D-638.

(3) Flame resistance

According to the estimating method described in the V-0 Standards of the UL-94 Regulations, ten test pieces were brought into contact with a flame twice for each test piece, 20 times in total. The average and maximum burning times at that time were examined, and also the number of test pieces which dripped by melting and caused absorbent cotton to catch fire was counted.

(4) Compatibility

The test pieces were frozen in a liquid nitrogen and broken to pieces, and the broken surface was observed by means of a scanning electron microscope to measure the maximum particle diameter (μm) of the flame retardant particles dispersed in the nylon matrix. The compatibility was evaluated by this maximum particle diameter. The smaller the maximum particle diameter, the better the compatibility.

EXAMPLES 1 TO 13 AND COMPARATIVE EXAMPLES 1 TO 3

Nylon-6,6 is blended with BrPS, BrSMAC, MBrPS, $Sb_2O_3$ and GF in proportions shown in Table 1. Each blend is melt-kneaded and extruded on twin-screw extruders, PCM 45 and PCM 30 (produced by Ikegai Iron Works, Ltd.), and pelletized. The pellets are injection-molded and evaluated. The results are shown in Table 1.

The systems with BrPS only as a flame retardant show that, whether GF is used or not, the weld strength is low, the flame resistance is poor and whitening is observable on the surface of the molded product (Comparative examples 1, 2, 3). On the other hand, the systems with BrSMAC-1, BrSMAC-2 and MBrPS prove to have been improved in the drawbacks above (Examples 1 to 13). On increasing the amount of maleic acid anhydride, the extrusion property become unstable (Example 7).

The GF-containing products, as compared with the GF-free ones, are relatively low in the strength and elongation of the weld portion, but high in the strength of the normal portion. Consequently, they have an advantage that molded products can be designed in a small thickness.

TABLE 1

| Item Unit | Composition | | | | | | | | | | Weld portion | |
|---|---|---|---|---|---|---|---|---|---|---|---|---|
| | Ny 66 | GF | BrPS | MBrPS wt. % | Br-SMAC-1 | Br-SMAC-2 | $Sb_2O_3$ | α mole % | Bromine* content wt. % | | Tensile strength kg/cm² | Tensile elongation % |
| Example 1 | 60 | 15 | | | 22 | | 3 | 9.5 | 17.4 | | 765 | 5.5 |
| Example 2 | 60 | 15 | 5.5 | | 16.5 | | 3 | 7.3 | 17.6 | | 763 | 5.3 |
| Example 3 | 60 | 15 | 11 | | 11 | | 3 | 5.0 | 17.8 | | 790 | 5.4 |
| Example 4 | 60 | 15 | 16.5 | | 5.5 | | 3 | 2.6 | 18.0 | | 810 | 5.5 |
| Example 5 | 60 | 15 | 17.6 | | 4.4 | | 3 | 2.1 | 18.1 | | 840 | 5.6 |
| Example 6 | 60 | 15 | 19.8 | | 2.2 | | 3 | 1.0 | 18.2 | | 890 | 5.9 |
| Comparative example 1 | 60 | 15 | 22 | | | | 3 | 0 | 18.2 | | 677 | 5.2 |
| Comparative example 2 | 53 | 15 | 24 | | | | 8 | 0 | 21.2 | | 390 | 2.9 |
| Example 7 | 60 | 15 | | | | 22 | 3 | 15.8 | 16.6 | | 750 | 5.5 |
| Example 8 | 60 | 15 | 17 | | | 5 | 3 | 4.0 | 17.9 | | 765 | 5.4 |
| Example 9 | 75 | | | | 22 | | 3 | 9.5 | 14.7 | | 827 | 12.7 |
| Example 10 | 75 | | 5.5 | | 16.5 | | 3 | 7.3 | 14.9 | | 790 | 13.0 |
| Example 11 | 75 | | 11 | | 11 | | 3 | 5.0 | 15.1 | | 755 | 12.9 |
| Example 12 | 75 | | 16.5 | | 5.5 | | 3 | 2.6 | 15.3 | | 799 | 14 |
| Comparative example 3 | 75 | | 22 | | | | 3 | 0 | 15.4 | | 480 | 4.9 |
| Example 13 | 75 | | | 22 | | | 3 | 1.7 | 14.7 | | 775 | 8.5 |

| Item Unit | Normal portion | | Flame resistance | | | | |
|---|---|---|---|---|---|---|---|
| | Tensile strength kg/cm² | Tensile elongation % | Burning time | | Number of pieces of absorbent cotton which caught fire piece | Appearance of the surface of molded product | Extrusion property |
| | | | Maximum sec | Average sec | | | |
| Example 1 | 1250 | 6.3 | 1.0 | 1.0 | 0 | | |
| Example 2 | 1280 | 6.5 | 1.0 | 1.0 | 0 | | |
| Example 3 | 1300 | 6.6 | 2.0 | 1.2 | 0 | | |
| Example 4 | 1320 | 6.7 | 2.2 | 1.3 | 0 | | |
| Example 5 | 1330 | 6.8 | 2.2 | 1.4 | 0 | | |
| Example 6 | 1340 | 6.8 | 2.3 | 1.3 | 0 | | |
| Comparative example 1 | 1402 | 7.2 | 7.0 | 3.2 | 6 | Whitening | |
| Comparative example 2 | 1210 | 6.2 | 2.0 | 1.0 | 1 | Whitening | |
| Example 7 | 1180 | 5.9 | 1.0 | 1.0 | 0 | | Unstable |
| Example 8 | 1280 | 6.4 | 3.6 | 1.2 | 0 | | |
| Example 9 | 840 | 6.7 | 1.0 | 1.0 | 0 | | |
| Example 10 | 865 | 7.4 | 1.0 | 1.0 | 0 | | |

TABLE 1-continued

| | | | | | | |
|---|---|---|---|---|---|---|
| Example 11 | 875 | 7.9 | 2.0 | 1.1 | 1 | |
| Example 12 | 875 | 7.9 | 1.0 | 1.0 | 1 | |
| Comparative example 3 | 870 | 7.8 | 13 | 4.4 | 10 | Whitening |
| Example 13 | 870 | 7.9 | 1 | 0.9 | 0 | |

*Bromine content $Z = b \times 0.01X + c \times 0.01Y$

COMPARATIVE EXAMPLES 4 AND 5

In the same manner as in Examples 1 to 13, blends having a composition shown in Table 2 are prepared, and the tensile strength and tensile elongation of the weld portion are evaluated.

From these results and the results of Example 7 and Comparative example 1, the following are found: When the blend of polyamide and a styrene/maleic acid anhydride copolymer is used, the strength and elongation of the weld portion are low as compared with the blend of polystyrene and polyamide; on the other hand, when the blend of polyamide and the brominated product of a styrene/maleic acid anhydride copolymer is used, the strength and elongation of the weld portion improves as compared with the blend of polyamide and brominated polystyrene.

TABLE 2

| | Composition | | | | | Weld portion | |
|---|---|---|---|---|---|---|---|
| | | | | | | Tensile | tensile |
| Unit | Ny 66 | GF | SMAC-2 wt. % | PS | $Sb_2O_3$ | strength $kg/cm^2$ | elongation % |
| Comparative example 4 | 60 | 15 | 22 | | 3 | 320 | 2.4 |
| Comparative example 5 | 60 | 15 | | 22 | 3 | 460 | 3.6 |

EXAMPLE 14

75 Parts by weight of nylon-6,6, 22 parts by weight of each of the flame retardants synthesized in Production examples 1 to 4 below and 3 parts by weight of antimony trioxide are kneaded at from 260° to 270° C. on a 30 mm twin-screw extruder (L/D=17) and pelletized to obtain a composition. This composition is injection-molded at 270° C. to prepare test pieces. The test pieces thus obtained are evaluated for the thin-plate tensile characteristics of weld portion, flame resistance and compatibility.

The results are shown in Table 3. "Production 1" in the table means the use of a flame retardant of Production example 1. The same applies to "Production 2" to "Production 4".

PRODUCTION EXAMPLE 1

To a flask equipped with a stirrer, a reflux condenser and a nitrogen inlet tube are added 52.5 g of brominated polystyrene (Pyrocheck 68PB, produced by Ferro Corp.; the same applies hereafter), 29.4 g of maleic acid anhydride and 500 ml of o-dichlorobenzene, and the contents of the flask is heated to 110° C. under a dry nitrogen gas stream.

To this solution is added 87.1 g of 2,5-dimethyl-2,5-di(tert-butylperoxy)hexane (Perhexa 25B, produced by Nippon Oils & Fats, Co., Ltd.; the same applies hereafter) to start the reaction.

After the reaction is continued at 110° C. for 9 hours, the reaction solution is poured into methanol to carry out precipitation, and re-precipitation is repeated with o-dichlorobenzene-methanol. The resulting product is a pale brown powdery polymer. This compound is presumed to have the following formula,

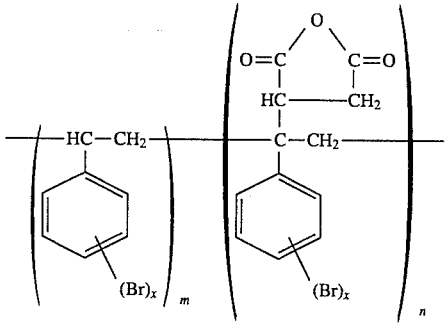

wherein x represents an integer of from 2 to 3. The yield is 51.0 g.

The amount of the acid anhydride groups in the molecule which are added to the brominated polystyrene is measured by titrating the polymer with sodium methoxide using o-dichlorobenzene as a solvent. As a result, it is found that 1.21 mole % of maleic acid anhydride was added. The infrared spectrum (hereinafter referred to as IR spectrum) of the polymer is shown in FIG. 2. The characteristic absorption of the acid anhydride group is confirmed in the vicinity of 1700 $cm^{-1}$, 1730 $cm^{-1}$ and 1780 $cm^{-1}$. For comparison, the IR spectrum of the brominated polystyrene, one of the materials, is shown in FIG. 3. This spectrum shows no characteristic absorption of the acid anhydride group at all.

PRODUCTION EXAMPLE 2

52.5 Grams of brominated polystyrene and 29.4 g of maleic acid anhydride, both of which are used in Production example 1, are dissolved in 500 ml of o-dichlorobenzene. After heating the resulting solution to 130° C. under a dry nitrogen gas stream, 8.71 g of 2,5-dimethyl-2,5-di(tert-butylperoxy)hexane is added to carry out the reaction. As a result, it is found that the amount of maleic acid anhydride which is added to the brominated polystyrene is 1.87 mole %.

PRODUCTION EXAMPLE 3

52.5 Grams of brominated polystyrene and 29.4 g of maleic acid anhydride are dissolved in 200 ml of o-dichlorobenzene. After heating the resulting solution to 100° C. under a dry nitrogen gas stream, 5.8 g of benzoyl peroxide is added to carry out reaction. As a result, it is found that the amount of maleic acid anhydride which is added to the brominated polystyrene is 4.36 mole %.

PRODUCTION EXAMPLE 4

According to Production example 1, brominated polystyrene to which 0.34 mole % of maleic acid anhydride added is prepared.

COMPARATIVE EXAMPLE 6 AND 7

In the same condition as in Example 14, to 75 parts by weight of nylon-6,6 and 3 parts by weight of antimony trioxide, are admixed 22 parts by weight of a flame retardant prepared in Reference example 1 below or 22 parts by weight of brominated polystyrene to which 0.03 mole % of maleic acid anhydride has been added, and the thin-plate tensile characteristics of weld portion, flame resistance and compatibility are evaluated. The results are shown in Table 3.

REFERENCE EXAMPLE 1

1.0 Gram of hydroxyapatite, $3Ca_3(PO_4)_2 \cdot Ca(OH)_2$, and 0.008 g of sodium oleate are suspended in distilled water. Thereafter, a mixed solution of 0.07 g of benzoyl peroxide, 40 g of tribromo-styrene and 4 g of acrylonitrile is added to carry out the reaction at 90° C. for 20 hours. The resulting polymer is collected by filtration, washed with hot water and dried.

EXAMPLES 15 TO 18 AND COMPARATIVE EXAMPLES 8 AND 9

(1) A blended composition of polyamide, brominated polystyrene, a styrene/maleic acid anhydride copolymer and antimony trioxide, (2) a blended composition of polyamide, brominated polystyrene to which maleic acid anhydride has grafted, and antimony trioxide, and (3) a blended composition of polyamide, brominated polystyrene, a brominated product of a styrene/maleic acid anhydride copolymer and antimony trioxide, are evaluated for thermal stability. This evaluation is carried out using a thermogravimetric apparatus (TGA) as follows: Each blended composition is kept at 290° C. for 1 hour under a nitrogen gas stream to measure a weight reduction percentage. The results are shown in Table 4.

These results suggest that the compositions of the present invention used in Examples 15 to 18, as compared with ones used in Comparative examples 8 and 9, are low in thermoweight reduction, so that they have good production stability and processability. In fact, with the composition used in Comparative example 9, the frequency of rope breaking at extrusion processing is 1 per 20 minutes, but with the compositions used in Examples 17 and 18, the extrusion processing is stable over more than 2 hours.

TABLE 3

|  |  | Example 14 | | | | Comparative example | |
|---|---|---|---|---|---|---|---|
|  |  | Production 1 | Production 2 | Production 3 | Production 4 | 6 | 7 |
| Composition | Nylon-6,6 | 75 | 75 | 75 | 75 | 75 | 75 |
| (part by | Flame retardant | 22 | 22 | 22 | 22 | 22 | 22 |
| weight) | $Sb_2O_3$ | 3 | 3 | 3 | 3 | 3 | 3 |
| Content of maleic acid anhydride (mole %) | | 1.21 | 1.87 | 4.36 | 0.34 | 0 | 0.03 |
| Bromine content (wt. %) | | 15.4 | 15.3 | 15.2 | 15.4 | 15.4 | 15.4 |
| Thin-plate tensile characteristics of weld portion | Strength (g/cm²) | 657 | 775 | 793 | 587 | 484 | 483 |
| | Elongation (%) | 7.2 | 8.5 | 33.8 | 5.9 | 4.7 | 4.9 |
| UL-94, 1/32 inch, Inflammability | | V-0 | V-0 | V-0 | V-0 | V-2 | V-2 |
| Maximum particle diameter (μm) | | 1 | 0.8 | 0.1 | 3 | 9 | 9 |

TABLE 4

| | Composition | | | | | | | Thermo-weight reduction percentage (TGA) wt. % |
|---|---|---|---|---|---|---|---|---|
| | Ny 66 | MBrPS | BrSMAC-2 | BrPS wt. % | SMAC-2 | Sb$_2$O$_3$ | GF | |
| Comparative example 8 | 73 | | | 22 | 2 | 3 | | 14.3 |
| Example 15 | | Composition of Production 3 in Example 14 | | | | | | 5.3 |
| Example 16 | 75 | | 2.2 | 19.8 | | 3 | | 9.5 |
| Comparative example 9 | 58 | | | 22 | 2 | 3 | 15 | 15.2 |
| Example 17 | 60 | 22 | | | | 3 | 15 | 5.8 |
| Example 18 | | Composition of Example 6 | | | | | | 10.2 |

EXAMPLES 19 TO 23

The flame resistance and the strength and elongation of the weld portion are evaluated at varying amounts of antimony trioxide added. The results are shown in Table 5.

These results show that antimony trioxide contributes to an improvement in the flame resistance as an auxiliary flame retardant, but that an excess of antimony trioxide sometimes lowers the strength and elongation of the weld portion. This suggests that it is desirable to use antimony trioxide in a necessary minimum amount.

resistance as in the use of Ny 66 can be obtained. In this experiment, 0.5 part by weight of 4,4'-butylidenebis(3-methyl-6-tert-butylphenol) is added as a thermal stabilizer.

TABLE 5

| | Composition | | | Weld portion | | Flame resistance | | Number of pieces of absorbent cotton which caught fire piece |
|---|---|---|---|---|---|---|---|---|
| | | | | Tensile | Tensile | Burning time | | |
| | Ny 66 | BrSMAC-1 wt. % | Sb$_2$O$_3$ | strength kg/cm$^2$ | elongation % | Maximum sec | Average sec | |
| Example 19 | 78 | 22 | 0 | 800 | 14.0 | 2 | 1.1 | 3 |
| Example 20 | 77 | 22 | 1 | 820 | 15.7 | 1 | 1 | 1 |
| Example 21 | 75 | 22 | 3 | 820 | 15.8 | 1 | 1 | 0 |
| Example 22 | 73 | 22 | 5 | 810 | 14.2 | 1 | 1 | 0 |
| Example 23 | 70 | 22 | 8 | 690 | 9.5 | 1 | 1 | 0 |

EXAMPLES 24 TO 26

Using Ny 6T66 as a base polyamide, compositions having a composition shown in Table 6 are prepared and evaluated in the same manner as in Example 1. The results are shown in Table 6. These results show that the same high weld strength and weld elongation and the same excellent flame

TABLE 6

| Item Unit | Composition | | | | | | | | Weld portion | |
|---|---|---|---|---|---|---|---|---|---|---|
| | Ny 6T66 | GF | BrPS | MBrPS wt. % | Br-SMAC-1 | Sb$_2$O$_3$ | α mole % | Bromine* content wt. % | Tensile strength kg/cm$^2$ | Tensile elongation % |
| Example 24 | 75 | | | 22 | | 3 | 1.7 | 14.7 | 784 | 10.4 |
| Example 25 | 75 | | 19.8 | | 2.2 | 3 | 1.0 | 14.7 | 870 | 6.1 |
| Example 26 | 60 | 15 | 19.8 | | 2.2 | 3 | 1.0 | 18.2 | 890 | 5.9 |

| | Normal portion | | Flame resistance | | |
|---|---|---|---|---|---|
| | Tensile | Tensile | Burning time | | Number of pieces of absorbent cotton which |
| Item | strength | elongation | Maximum | Average | caught fire |

TABLE 6-continued

| | Unit | kg/cm² | % | sec | sec | piece |
|---|---|---|---|---|---|---|
| | Example 24 | 800 | 7 | 1 | 0.2 | 0 |
| | Example 25 | 790 | 7 | 1 | 0.3 | 0 |
| | Example 26 | 1230 | 6 | 1 | 0.5 | 0 |

*Same as defined in Remarks for Table 1.

EXAMPLES 27 TO 30

Using Ny46 [Relative viscosity in sulfuric acid (JIS-K-6810): 3.57] and Ny6T 66 612 [Ny6T:Ny66:Ny612 =40:55:5, Relative viscosity in sulfuric acid (JIS-K-6810): 2.67] as a base polymer, compositions shown in Table 7 were extruded, pelletized and evaluated in the same manner as in Example 1.

The results are shown in Table 7, with each showing excellent characteristics.

TABLE 7

| | Composition | | | | | | | | | Weld portion | |
|---|---|---|---|---|---|---|---|---|---|---|---|
| Item Unit | Ny 46 | Ny 6T 66 612 | GF | BrPS | MBrPS wt. % | Br-SMAC-1 | $Sb_2O_3$ | α | Bromine* content | Tensile strength kg/cm² | Tensile elongation % |
| Example 27 | 60 | | 15 | | 22 | | 3 | 1.7 | 18.2 | 890 | 6.0 |
| Example 28 | 60 | | 15 | 19.8 | | 2.2 | 3 | 1.0 | 18.2 | 880 | 5.9 |
| Example 29 | | 60 | 15 | | 22 | | 3 | 1.7 | 18.2 | 890 | 5.9 |
| Example 30 | | 60 | 15 | 19.8 | | 2.2 | 3 | 1.0 | 18.2 | 880 | 5.9 |

| | | | Flame resistance | | |
|---|---|---|---|---|---|
| | Normal portion | | | | Number of pieces of |
| | Tensile | Tensile | Burning time | | absorbent cotton which |
| Item Unit | strength kg/cm² | elongation % | Maximum sec | Average sec | caught fire piece |
| Example 27 | 1270 | 7 | 1 | 0.4 | 0 |
| Example 28 | 1210 | 6 | 1 | 0.4 | 0 |
| Example 29 | 1250 | 7 | 1 | 0.5 | 0 |
| Example 30 | 1200 | 6 | 1 | 0.4 | 0 |

What is claimed is:

1. A flame-resistant polyamide resin composition consisting of:

(A) a polyamide, (B) a flame retardant consisting of a modified brominated polymer having from 0.1 to 20 mole % of acid anhydride groups, based on the total moles of flame retardant (B), and a bromine content of from 50 to 80 wt. %, based on the total weight of flame retardant (B), said modified brominated polymer being a brominated copolymer of an unsaturated compound and an unsaturated compound having acid anhydride groups, wherein said unsaturated compound is represented by the formula (1):

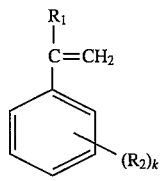

wherein $R_1$ and $R_2$, which may be the same or different, each represents a hydrogen atom or an alkyl group having 1 to 3 carbon atoms, and k represents an integer of 5;

(C) a flame retardant consisting of an unmodified brominated polystyrene, in which the bromine content is from 50 to 80 wt. %, based on the total weight of flame retardant (C), and (D) an antimony compound,
said composition satisfying the following conditions:

$$a+b+c=100$$

$$0.5 \leq b \leq 35$$

$$0 \leq c \leq 34.5$$

$$5 \leq b+c \leq 35$$

$$0.1 \leq \alpha \leq 20$$

$$14 \leq ((b)(0.01x))+((c)(0.01y)) \leq 20$$

wherein a, b and c represent the amounts in weight % of components (A), (B) and (C), respectively, x and y represent the bromine contents in weight % of component (B) based on the total weight of flame retardant (B) and of component (C) based on the total weight of flame retardant (C), respectively, and α represents the total amount in mole % of the acid anhydride groups of component (B).

2. The flame-resistant polyamide resin composition according to claim 1, wherein the polyamide of component (A) is a member selected from the group consisting of a copolymer of nylon-6,6 and nylon-6, a blend of nylon-6,6 and nylon-6, a copolymer of nylon-6T and nylon-6,6 and a terpolymer of nylon-6T, nylon-6,6 and nylon-6,12.

3. The flame-resistant polyamide resin composition according to claim 1, wherein α is 1.5 or more.

4. The flame-resistant polyamide resin composition according to claim 3, wherein α is 2.2 or more.

5. The flame-resistant polyamide resin composition according to claim 1, wherein the ratio of b to c is 0.5 or more.

6. The flame resistant polyamide resin composition according to claim 1, wherein component (B) is prepared by reacting a brominated polymer of an unsaturated compound having formula (1) with a compound having an anhydride acid group.

7. The flame-resistant polyamide resin composition according to claim 1, wherein said unsaturated compound is styrene.

8. The flame-resistant polyamide resin composition according to claim 1, wherein said unsaturated compound is α-methylstyrene of p-methylstyrene.

9. The flame resistant polyamide resin composition according to claim 1, wherein component (B) is formed by brominating a polymer prepared by reacting a polymer of an unsaturated compound having formula (1) with a compound having an anhydride acid group.

10. The flame-resistant polyamide resin composition according to claim 1, wherein the antimony compound is selected from the group consisting of antimony trioxide, antimony pentoxide and sodium antimonate.

11. The flame-resistant polyamide resin composition according to claim 10, wherein said antimony oxide is antimony trioxide.

12. The flame-resistant polyamide resin composition according to claim 11, wherein the antimony trioxide is present in an amount up to 15 parts by weight based on 100 parts by weight of the total amount of components (A), (B) and (C).

13. A flame-resistant polyamide resin composition consisting of:

(A) a polyamide or a blend of polyamide with an aliphatic olefin polymer, a non-brominated styrene polymer, polyphenylene oxide, polycarbonate, polyethylene terephthalate or polyphenylene sulfide, (B) a flame retardant consisting of a modified brominated polymer having from 0.1 to 20 mole % of acid anhydride groups, based on the total moles of flame retardant (B), and a bromine content of from 50 to 80 wt. %, based on the total weight of flame retardant (B), said modified brominated polymer being a brominated copolymer of said unsaturated compound and an unsaturated compound having acid anhydride groups, wherein said unsaturated compound is represented by the formula (1):

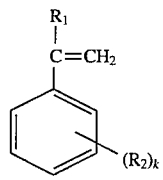

wherein $R_1$ and $R_2$, which may be the same or different each represents a hydrogen atom or an alkyl group having 1 to 3 carbon atoms, and k represents an integer of 5, (C) a flame retardant consisting of an unmodified brominated polystyrene, in which the bromine content is from 50 to 80 wt. %, based on the total weight of flame retardant (C), and (D) an antimony compound, said composition satisfying the following conditions:

$a+b+c=100$ $0.5 \leq b \leq 35$ $0 \leq c \leq 34.5$ $5 \leq b+c \leq 35$ $0.1 \leq \alpha \leq 20$ $14 < ((b)(0.01x)) + ((c)(0.01y)) < 20$ wherein a, b and c represent the amounts in weight % of components (A), (B) and (C), respectively, x and y represent the bromine contents in weight % of component (B) based on the total weight of flame retardant (B) and of component (C) based on the total weight of flame retardant (C), respectively, and g represents the total amount in mole % of the acid anhydride groups of component (B).

* * * * *